United States Patent
Emmerling et al.

(10) Patent No.: US 10,953,851 B2
(45) Date of Patent: Mar. 23, 2021

(54) ENTRY AND STARTING SYSTEM AND METHOD FOR ENTRY AND STARTING VERIFICATION

(71) Applicant: Continental Automotive GmbH, Hannover (DE)

(72) Inventors: Ulrich Emmerling, Kelheim (DE); Wolfgang Piesch, Regensburg (DE); Robert Obermaier, Hemau-Hohenschambach (DE); Stefan Hammes, Regensburg (DE)

(73) Assignee: Continental Automotive GmbH

( * ) Notice: Subject to any disclaimer, the term of this patent is extended or adjusted under 35 U.S.C. 154(b) by 149 days.

(21) Appl. No.: 16/125,916

(22) Filed: Sep. 10, 2018

(65) Prior Publication Data
US 2019/0077370 A1 Mar. 14, 2019

(30) Foreign Application Priority Data
Sep. 12, 2017 (DE) .................. 10 2017 216 029.2

(51) Int. Cl.
*B60R 25/24* (2013.01)
*G07C 9/00* (2020.01)
(Continued)

(52) U.S. Cl.
CPC ............ *B60R 25/209* (2013.01); *B60R 25/04* (2013.01); *B60R 25/245* (2013.01); *G07C 9/00* (2013.01);
(Continued)

(58) Field of Classification Search
CPC ..... B60R 25/04; B60R 25/209; B60R 25/245; B60R 2325/10; B60R 2325/108;
(Continued)

(56) References Cited

U.S. PATENT DOCUMENTS 6,822,551 B2 * 11/2004 Li .................. B67D 7/0401
340/10.1
7,561,691 B2 * 7/2009 Blight .................. H04L 63/08
380/247
(Continued)

FOREIGN PATENT DOCUMENTS

DE 102009006975 A1 8/2009
DE 102009014975 A1 * 9/2010 ............. B60R 25/24
(Continued)

OTHER PUBLICATIONS

German Search Report for German Application No. 10 2017 216 029.2, dated May 9, 2018, with partial translation—7 pages.

*Primary Examiner* — Robert T Nguyen
(74) *Attorney, Agent, or Firm* — RatnerPrestia (57) ABSTRACT

An entry and starting system in an object has a control and transmission unit configured to use a radio link to interchange at least one radio signal and an ultrasonic link to interchange at least one ultrasonic signal with a portable electronic device. The control and transmission unit sets up a radio link to the portable electronic device and uses the electronic device via the radio link to stipulate at least one relevant parameter for a subsequent ultrasonic link. The control and transmission unit is additionally configured so as, following the stipulation of the parameters, to set up an ultrasonic link according to the previously determined parameters. The entry and starting system checks an authorization of the portable electronic device, the portable electronic device being detected as authorized if the at least one relevant parameter of a subsequent ultrasonic link is concordant with the at least one stipulated parameter.

9 Claims, 4 Drawing Sheets (51) Int. Cl.
*B60R 25/04* (2013.01)
*B60R 25/20* (2013.01)

(52) U.S. Cl.
CPC ...... *G07C 9/00309* (2013.01); *B60R 2325/10* (2013.01); *B60R 2325/108* (2013.01); *B60R 2325/205* (2013.01); *G07C 2009/00555* (2013.01); *G07C 2009/00793* (2013.01); *G07C 2009/00801* (2013.01); *G07C 2209/63* (2013.01)

(58) Field of Classification Search
CPC ............... B60R 2325/205; G07C 9/00; G07C 9/00309; G07C 9/00555; G07C 9/00793; G07C 9/00801; G07C 9/63; H04W 12/003; H04W 12/06; H04W 12/0602
See application file for complete search history.

(56) References Cited

U.S. PATENT DOCUMENTS

| 8,643,510 | B2 |   | 2/2014 | Schräbler et al. |           |
|-----------|----|---|--------|------------------|-----------|
| 9,901,008 | B2 | * | 2/2018 | Shedd            | F28D 15/00 |
| 2019/0047511 | A1 | * | 2/2019 | Link, II      | B60R 25/24 |

FOREIGN PATENT DOCUMENTS

| DE | 102009014975 | A1 | 9/2010 |
| DE | 102015107410 | A1 | 12/2016 |
| EP |      0990757 | A2 | 4/2000 |

\* cited by examiner

ENTRY AND STARTING SYSTEM AND METHOD FOR ENTRY AND STARTING VERIFICATION

CROSS REFERENCE TO RELATED APPLICATION

This application claims priority to German Patent Application No. 10 2017 216 029.2, filed Sep. 12, 2017, the contents of such application being incorporated by reference herein.

FIELD OF THE INVENTION

The invention relates to an entry and starting system and to a method for entry and starting verification, in particular for entry and starting verification in a vehicle.

BACKGROUND OF THE INVENTION

Keyless vehicle entry and starting systems, such as the Passive Start Entry (PASE) system, for example, are automatic systems for unlocking a vehicle without active use of an automobile key and for starting said vehicle by merely operating the starting button. In this case, the vehicle has a transmission unit arranged in it that transmits signals. These are electromagnetic signals in the LF (Low Frequency) or HF (High Frequency) band, for example. The signals are received by a transponder unit when the latter is close to the vehicle, and are subsequently evaluated and/or processed further. Following the evaluation and/or further processing in the transponder unit, corresponding response signals can be sent back again to the transmission unit in the vehicle. The response signals are sent in the UHF frequency band, for example, and can be evaluated in the vehicle by an evaluation unit. If a response signal is detected as correct and hence the transponder unit is detected as belonging to the vehicle, the vehicle can be unlocked or started. Other functions in the vehicle can also be controlled in this manner.

Such systems can be attacked relatively easily, however, e.g. by means of what are known as relay attacks.

SUMMARY OF THE INVENTION

An aspect of the invention aims to provide an improved entry and starting system and an improved method for entry and starting verification that better protect a vehicle or another object against unwanted attacks from third parties.

An entry and starting system in an object has a control and transmission unit configured to use a radio link to interchange at least one radio signal in at least one direction and to use an ultrasonic link to interchange at least one ultrasonic signal in at least one direction with a portable electronic device. The control and transmission unit is configured to set up a radio link to the portable electronic device and to use the electronic device via the radio link to stipulate at least one relevant parameter for a subsequent ultrasonic link. The control and transmission unit is additionally configured so as, following the stipulation of the parameters, to set up an ultrasonic link according to the previously determined parameters. The entry and starting system is configured to check an authorization of the portable electronic device, the portable electronic device being detected as authorized if the at least one relevant parameter of a subsequent ultrasonic link is concordant with the at least one stipulated parameter.

This renders it substantially more difficult for an unauthorized party to attack the system. Therefore, the system is more secure and it is more difficult for unauthorized parties to gain entry to the object and possibly to steal it.

The at least one parameter to be stipulated can have at least one from a number of ultrasonic signals sent during the subsequent ultrasonic link, a direction in which at least one ultrasonic signal is sent during the subsequent ultrasonic link, at least one time at which at least one ultrasonic signal is sent during the subsequent ultrasonic link, a volume of the at least one ultrasonic signal sent during the subsequent ultrasonic link and a frequency of the at least one ultrasonic signal sent during the subsequent ultrasonic link.

The stipulation of such parameters again renders it more difficult for an unauthorized party to illegally gain entry to the object.

The radio link may be an encrypted radio link, so that an unauthorized party cannot obtain information about the stipulated parameters by monitoring the radio link.

The parameters are stipulated randomly before every ultrasonic link. Therefore, it is not possible for an unauthorized party to tell what parameters are determined. An unauthorized party cannot infer the parameters of a subsequent ultrasonic link from the observed parameters of an ultrasonic link. The security of the system is thereby increased further.

The control and transmission unit and/or the electronic device may moreover be configured to generate pseudorandom noise for sending the ultrasonic signals and to filter out ultrasonic signals from received pseudorandom noise. An unauthorized party monitoring the ultrasonic link receives only noise and cannot filter out the actual signals from the noise. The security of the system is thereby increased further.

During an ultrasonic link, at least one from the direction of the signals, the volume of the signals and the frequency of the signals can change at least once. To be able to extend the transmission link, an unauthorized party would have to send and receive in both directions at any time, since he has no information about at what time and in which direction signals are sent. This can lead to feedback in simple systems for extending the transmission link. In order to be able to extend the transmission link, very complex, large and expensive devices are required.

The electronic device may be a cellphone, smartphone, tablet or laptop. Such electronic devices are usually always carried by users today. These devices normally already have all, or at least most, components required for a radio link and for an ultrasonic link. The object may be a vehicle, for example.

The entry and starting system can moreover have a sound generation unit, wherein the sound generation unit can have at least one actuator. The actuator may be configured to generate ultrasound by setting at least one surface of the object oscillating. As a result, no loudspeakers are required in the object. Ultrasound can thus be generated in a simple and inexpensive manner by surfaces provided as standard in the object. Such a solution using a sound generation unit having an actuator also needs less space than an additional loudspeaker.

A method for entry and starting verification involves: setting up a radio link between a control and transmission unit and a portable electronic device; stipulating at least one relevant parameter for a subsequent ultrasonic link; setting up an ultrasonic link according to the previously determined parameters; and checking an authorization of the portable electronic device, the portable electronic device being detected as authorized if the at least one relevant parameter of a subsequent ultrasonic link is concordant with the at least one stipulated parameter.

An entry and starting system in an object has a control and transmission unit. The control and transmission unit is configured to set up a radio link to a portable electronic device. The entry and starting system is configured to use at least two loudspeakers in the object to transmit at least one ultrasonic signal each. The entry and starting system is configured to determine the position of the portable electronic device on the basis of the propagation times of the at least two ultrasonic signals between the applicable loudspeaker and the electronic device, wherein the determined position is at a respective determined distance from each of the at least two loudspeakers. The entry and starting system is moreover configured to use each of the at least two loudspeakers to transmit a further ultrasonic signal, wherein the further ultrasonic signals are consistent with one another and are opposite only in their phase and are transmitted at a determined interval of time from one another according to the distance between the respective loudspeaker and the determined position, so that the further ultrasonic signals arrive at the determined position at the same time and cancel one another out.

The transmission of the further ultrasonic signals such that they cancel one another out at the previously determined position of the electronic device makes it possible to confirm whether the electronic device is actually at this position. If the determined position is correct, the electronic device receives no further ultrasonic signals on account of the cancellation. If the electronic device still receives further ultrasonic signals, it can be assumed that the position determination was erroneous.

The interval of time for transmitting the further ultrasonic signals may be consistent with the propagation time difference between the first ultrasonic signals from the respective loudspeakers at the determined position. This ensures that the signals arrive at the determined position at the same time.

The determined position can be regarded as correct if, following the transmission of the further ultrasonic signals, no ultrasonic signals are received by the electronic device. However, it is also possible to measure the volume of an ultrasonic signal received by the electronic device following the transmission of the further ultrasonic signals. The determined position can also be regarded as correct if the determined volume is below a prescribed limit value.

This also takes into consideration tolerances of the system that mean that the two further ultrasonic signals possibly do not cancel one another out completely.

A method for entry and starting verification in an object involves: setting up a radio link between a control and transmission unit and a portable electronic device; transmitting at least one respective ultrasonic signal via at least two loudspeakers in the object; determining the position of the portable electronic device on the basis of the propagation times of the at least two ultrasonic signals between the applicable loudspeaker and the electronic device, wherein the determined position is at a respective determined distance from each of the at least two loudspeakers; and transmitting a respective further ultrasonic signal via each of the at least two loudspeakers, wherein the further ultrasonic signals are consistent with one another and are opposite only in their phase and are transmitted at a determined interval of time from one another according to the distance between the respective loudspeaker and the determined position, so that the further ultrasonic signals arrive at the determined position at the same time and cancel one another out.

BRIEF DESCRIPTION OF THE DRAWINGS

Aspects of the invention are explained in more detail below on the basis of the figures of the drawing, wherein like or similar elements are provided with the same reference signs. In the figures.

DETAILED DESCRIPTION OF THE PREFERRED EMBODIMENTS

Figure 1:
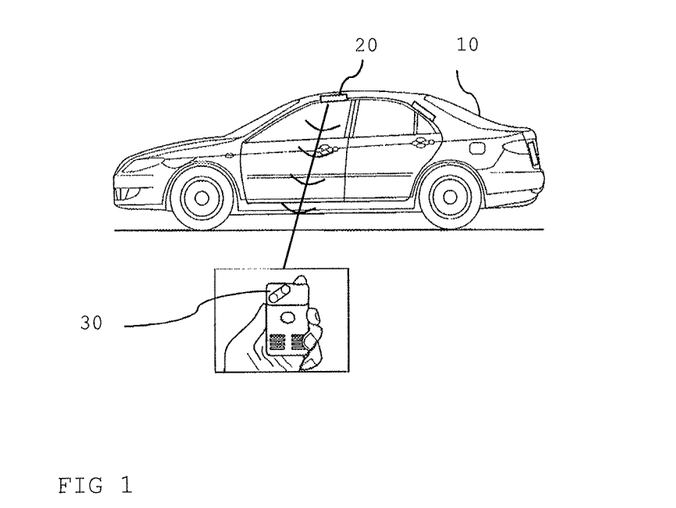
FIG. 1 shows an outline depiction of the principle of a keyless vehicle entry and starting system.

FIG. 1 shows a schematic depiction of the principle of a keyless vehicle entry and starting system. The vehicle 10 has a control and transmission unit 20 arranged in it that is configured to transmit radio signals. These are electromagnetic signals in the LF (Low Frequency) or HF (High Frequency) band, for example. These signals are received by a transponder unit 30 when the latter is close to the vehicle 10, and are subsequently evaluated and/or processed further. Following the evaluation and/or further processing in the transponder unit 30, corresponding response signals can be sent back again to the control and transmission unit 20. The response signals are sent in the UHF frequency band, for example, and can be evaluated in the vehicle 10 by the control and transmission unit 20 or by a separate evaluation unit, not depicted in FIG. 1. The transponder unit 30 may be arranged in an electronic vehicle key that the driver of the vehicle 10 carries, for example.

To receive the signals sent by the control and transmission unit 20, the transponder unit 30 must be within a particular radius of the vehicle 10, since signals in the LF and HF bands have only a limited range. This radius may be 10 m, for example. This is merely an example, however. The range may also be greater or less. The sending of a response signal from the transponder unit 30 to the control and transmission unit 20 or to an evaluation unit in the vehicle 10 can be effected over a greater distance if the response signals are in the UHF frequency band, since these have a greater range.

The control and transmission unit 20 can transmit signals continually or only upon a particular event. Such an event may be the touching or operation of a door handle or of a vehicle starting button, for example. Any other suitable type of event is likewise possible. If the transponder unit 30 sends a correct response signal for a signal received from the control and transmission unit 20, the vehicle 10 is unlocked.

Such systems can be attacked relatively easily, however, e.g. by means of what are known as relay attacks. In this case, it is possible for two devices, one of which is close to the vehicle 10 and the other of which is close to the transponder unit 30, to be used to span a greater distance between the vehicle 10 and the transponder unit 30 by virtue of the radio link of the LF (Low Frequency) or HF (High Frequency) communication channel used being extended, for example. In this manner, a vehicle can be opened and started even though the vehicle key is not within the necessary range.

Figure 2:
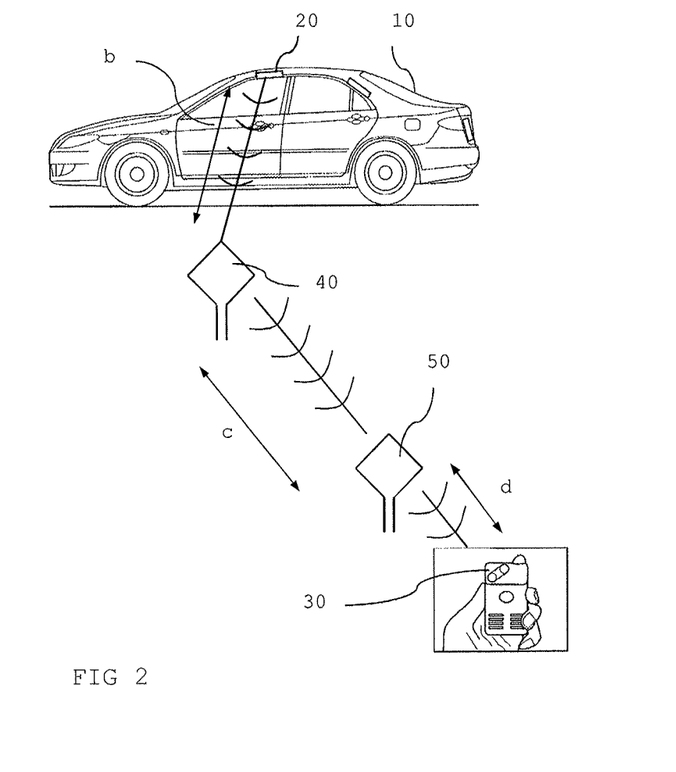
FIG. 2 shows an outline depiction of the principle of an attack on a keyless vehicle entry and starting system.

FIG. 2 shows a schematic depiction of the principle of such a relay attack on a keyless vehicle entry system as a result of extension of the radio link of a communication channel. In the depiction shown in FIG. 2, the key having the transponder unit 30 is outside the range of the request signals sent by the control and transmission unit 20. Within the radius necessary for receiving the signals, however, there is a first device 40, which has an antenna, close to the vehicle 10. The distance between the first device 40 and the control and transmission unit 20 in the vehicle 10 is denoted by b. Arranged within the range of the transponder unit 30, there is a second device 50, which likewise has an antenna. The distance between the second device 50 and the first device 40 is denoted by c, and the distance between the second device 50 and the transponder unit 30 is denoted by d.

The first device 40 close to the vehicle 10 receives the signals transmitted by the control and transmission unit 20, and forwards them to the second device 50. The second device 50 in turn sends the signals to the transponder unit 30. In order to be able to transmit the signals over a distance c between the first and second devices 40, 50, which is for the most part significantly greater than the normal range of LF or HF signals, e.g. amplifiers and transmission stages are necessary in the devices 40, 50. This arrangement can therefore be used to span a distance of theoretically any size between the vehicle 10 and the key having the transponder unit 30.

In the key, the signal is received, evaluated and/or processed by the transponder unit 30. The response signal transmitted thereupon by the transponder unit 30 can be transmitted back to the vehicle 10 again using the same arrangement having the first and second devices 40, 50. The evaluation electronics arranged in the vehicle 10 therefore initially do not detect that the key is not within the range. Although the key is not within the range, the vehicle 10 can therefore still be opened.

In order to prevent such attacks and unauthorized opening and starting of the vehicle 10, arrangements are known that are able to determine the position of the transponder unit 30. Such systems can determine whether the transponder unit 30 is in the interior of the vehicle 10 or outside, for example. If the transponder unit 30 is detected as being outside the vehicle 10, vehicle starting can be prevented, for example, so that the vehicle 10 cannot be stolen by unauthorized persons. However, it is also possible to determine the exact position of the transponder unit 30. This is possible with an accuracy of up to 5 cm using some methods. Accurate localization of the transponder unit 30 can also be used to activate and/or set a wide variety of convenience functions in the vehicle 10, for example.

Vehicle keys are more and more frequently being replaced by portable electronic devices 60 today. This is depicted by way of example in FIG. 3. Portable electronic devices 60 may be cellphones, in particular smartphones, tablets, laptops or any other portable electronic devices that the user can carry, for example. In particular smart phones, but also other electronic devices, are carried by most users today in addition to the vehicle key. Portable electronic devices 60 of this kind normally already have a multiplicity of different components as standard, such as loudspeakers, microphones or connecting modules for setting up wireless links, for example, such as NFC (Near Field Communication) or Bluetooth interfaces, for example. As such, the portable electronic device 60 can undertake the functions of the vehicle key without additional components being required. This firstly reduces the costs of the system, and also the user no longer needs to carry both his cellphone (or other electronic device 60) and the vehicle key. The cellphone (or other electronic device 60) alone is sufficient.

Figure 3:
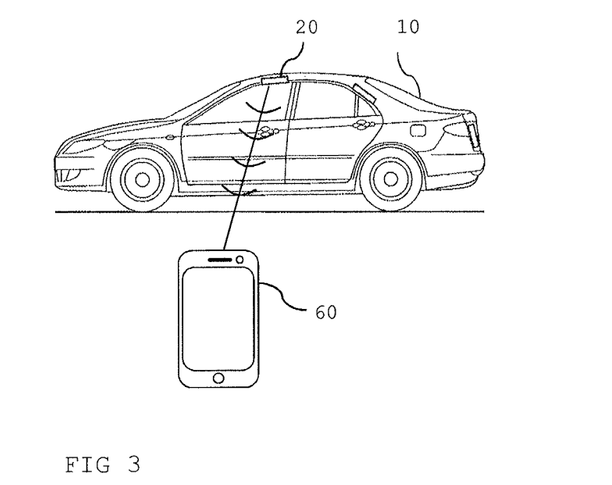
FIG. 3 shows an outline depiction of an entry and starting system in which a cellphone is used as a vehicle key.

By way of example, the cellphone (or other electronic device 60 that the user carries) may have an appropriate application (app) installed on it. The electronic device 60 may be connected to the control and transmission unit 20 via a wireless communication link. This wireless communication link can be used by the electronic device 60 and the control and transmission unit 20 to communicate with one another. The wireless communication link may be any suitable wireless link by means of which the required signals can be sent. By way of example, the wireless communication link may be a Bluetooth link, Bluetooth Low Energy (BLE) link or near field communication link (NFC).

Bluetooth is an internationally standardized data interface. Bluetooth can be used to interchange data or files between two devices or to transmit music and voice, for example. Bluetooth devices in this case send at a frequency of 2.4 GHz and allow a data transmission at a short range of normally less than 50 m. At present, various Bluetooth standards are known, for example Bluetooth 1.0 and 1.0B 1999, Bluetooth 2.0+ EDR 2004 or Bluetooth 4.0 2009, all of which are incorporated by reference herein. In this case, it is of no significance to aspects of the present invention which standard the electronic device 60 and the control and transmission unit 20 use to communicate with one another. In order to allow communication, however, it is normally a requirement for two Bluetooth-compatible devices between which a link is to be set up to communicate using the same standard. Some of the standards are also compatible with one another, however.

Bluetooth devices normally consume a relatively large amount of power. Particularly in vehicles and the associated transponder units (vehicle keys), power consumption is for the most part critical, however. Thus, what are known as Bluetooth Low Energy (BLE) communication interfaces can be found more and more frequently in vehicles and portable electronic devices 60. Bluetooth Low Energy is often also referred to as Bluetooth Smart. BLE is based on conventional Bluetooth technology, but has significantly lower power consumption and is normally less expensive. When BLE devices are used in an electronic device 60, the battery of the electronic device 60 is therefore under less load than with conventional Bluetooth devices.

NFC allows contactless data interchange between devices over a distance of a few centimeters. NFC can be used to transmit up to 424 Kbit/s. Near field communication involves the data interchange being effected by means of an inductive coupling between two inductances (e.g. antennas). The inductance of one communication device acts as what is known as an initiator in this case, and the inductance of the other communication device acts as what is known as a target. The electromagnetic fields radiate from the initiator to the target at a frequency of 13.56 MHz.

Figure 4:
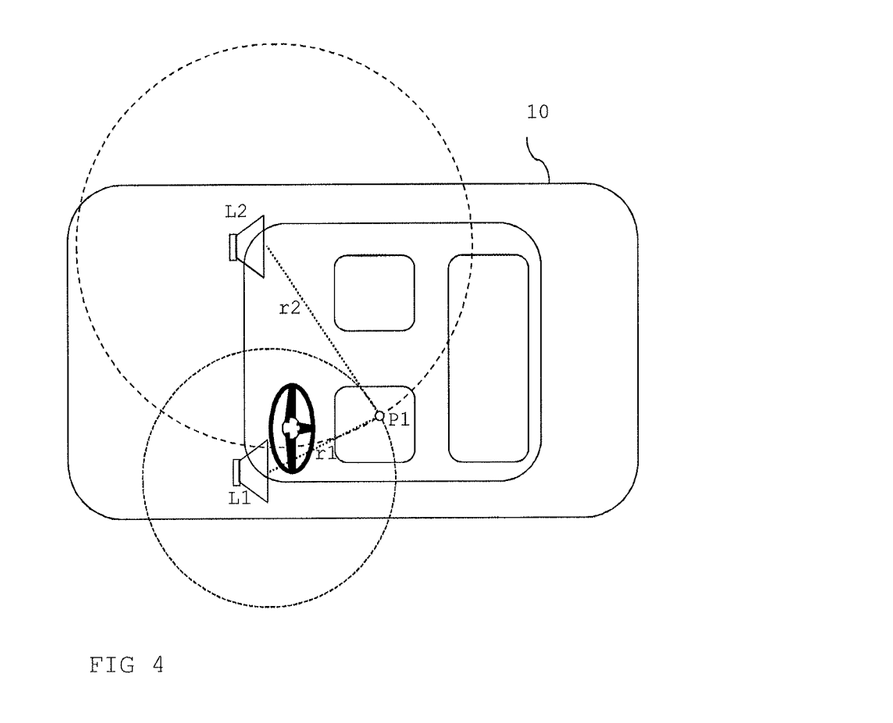
FIG. 4 shows an outline depiction of an arrangement for detecting the position of a portable electronic device, the portable electronic device being in the vehicle.

The position of an electronic device 60 can be detected by transmitting ultrasonic waves, for example. This is depicted by way of example in FIG. 4. The system in FIG. 4 has at least two loudspeakers L1, L2. Various loudspeakers are fundamentally already present in a vehicle 10. These are connected to a music system and/or an entertainment system of the vehicle, for example, FIG. 4 shows two loudspeakers L1, L2 by way of example, any other number of loudspeakers being possible, but at least two. The loudspeakers L1, L2 in this case may be arranged at any positions in the vehicle 10.

To perform position determination, the electronic device 60 can use an appropriate application (app) installed on the electronic device 60 beforehand, for example. The electronic device 60 and the vehicle 10 can have a link set up between them, for example by means of WLAN (wireless local area network), Bluetooth or Bluetooth Low Energy (BLE), as already described above. A link by means of WLAN or Bluetooth is merely an example, however. The link can be set up in any wireless manner, but also in a wired manner. A wireless link can be set up automatically, for example, as soon as the electronic device 60 is close to the vehicle 10. If a (radio) link has been successfully set up between vehicle 10 and electronic device 60, position determination can be started by means of ultrasound. Position determination in this case can be started entirely automatically directly after setup of the (radio) link or in response to a start command from the user, for example. However, it is also possible for the position determination to be started in response to any triggering event. For example when the user touches the door handle, when an ignition key has been inserted into the lock, when the driver's door has been closed, or the like.

Position determination can firstly involve a radio link being set up between the control and transmission unit 20 and the electronic device 60. As a result, both devices know that a position determination is started. In the electronic device 60, an appropriate application (app) can be started in response to a signal from the control and transmission unit 20, for example, and the electronic device 60 can wait for the reception of ultrasonic signals. For position determination, a first loudspeaker L1 can then be used to transmit at least one first ultrasonic signal. This is depicted by way of example in FIG. 4. The electronic device 60 can receive the first ultrasonic signal, for example by means of a microphone installed in the electronic device 60. The system knows the time at which the first ultrasonic signal was transmitted by the first loudspeaker L1. The time at which the first ultrasonic signal is received in the electronic device 60 is ascertained by the system, and the propagation time of the first ultrasonic signal from the first loudspeaker L1 to the electronic device 60 is ascertained therefrom. The speed at which the ultrasonic signal propagates is known (speed of sound). Therefore, a first distance r1 of the electronic device 60 from the applicable first loudspeaker L1 can be computed from the known speed and the propagation time.

The same process can subsequently be performed with a second loudspeaker L2 and optionally also with a third or further loudspeakers in order to determine at least one second distance r2 of the electronic device 60 from a second loudspeaker L2 and optionally further distances of the electronic device 60 from further loudspeakers. The system therefore knows that the electronic device 60 is somewhere on an arc having a first radius r1 (r1=first distance) around the first loudspeaker L1. The system likewise knows that the electronic device 60 is on an arc having a second radius r2 (r2=second distance) around the second loudspeaker L2, and so on. The exact position of the electronic device 60 is at the point at which the arcs intersect (see FIG. 4). When just two loudspeakers L1, L2 are used, two points of intersection for the arcs are obtained. However, the position of the electronic device 60 can also normally still be determined with sufficient accuracy with two loudspeakers L1, L2 in order to make a decision as to whether the electronic device 60 is inside or outside the vehicle 10. By way of example, to determine whether the electronic device 60 is inside or outside the vehicle 10, it is also possible for the propagation time differences between the signals to be considered as an alternative or in addition to the actual distances r1, r2 from the loudspeakers L1, L2. If the electronic device 60 is inside the vehicle 10, that is to say between the loudspeakers L1, L2, the propagation time differences are for the most part small in comparison with the situation when the electronic device 60 is outside the vehicle 10 (see FIG. 5). The more loudspeakers L1, L2 are used for the method, the more accurate the position determination fundamentally becomes.

Determination of the propagation time and of the distance between the loudspeakers L1, L2 and the electronic device 60 can be effected in this case either in the control and transmission unit 20 or in the electronic device 60 itself. By way of example, the electronic device 60 is able, following reception of an ultrasonic signal from the control and transmission unit 20, to use the radio link to communicate the time at which the signal was received. The control and transmission unit 20 can then perform determination of the distance and/or position. However, it is also possible for the control and transmission unit 20 to communicate to the electronic device 60 the time at which an ultrasonic signal was transmitted, and for the electronic device 60 to perform the determination. Subsequently, the electronic device 60 can then use the radio link, for example, to communicate to the control and transmission unit 20 the ascertained distances and/or the ascertained position.

In the example depicted in FIG. 4, the position P1 of the electronic device 60 is inside the vehicle 10, for example. The propagation time differences of the signals between the first loudspeaker L1 and the electronic device 60 and between the second loudspeaker L2 and the electronic device 60 are relatively small in this case. If the propagation time differences are only small (below a particular threshold value) and the signals are received by the electronic device 60 within a particular period, it can be concluded therefrom that the electronic device 60 is inside the vehicle. If the propagation time differences are relatively large (above a prescribed threshold value) and/or if the propagation times are generally very long (above a particular threshold value), it can be concluded therefrom that the electronic device 60 is outside the vehicle.

Figure 5:
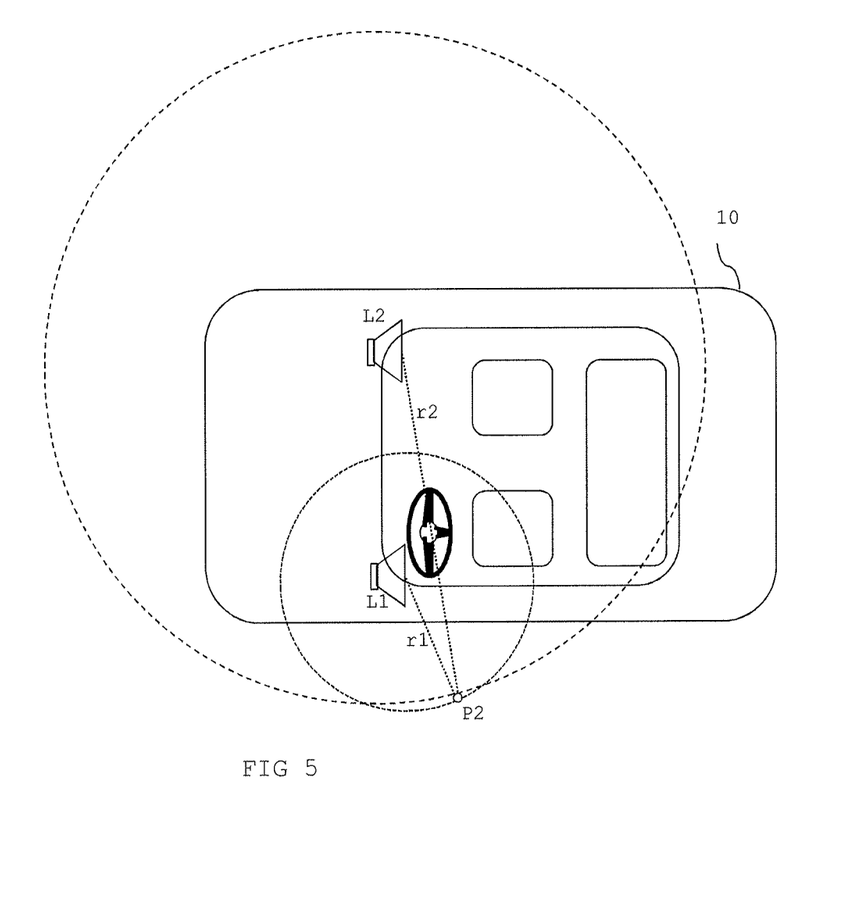
FIG. 5 shows an outline depiction of an arrangement for detecting the position of a portable electronic device, the portable electronic device being outside the vehicle.

An electronic device 60 outside the vehicle 10 at a position P2 is depicted by way of example in FIG. 5. FIG. 5 clearly reveals that the electronic device 60 is much closer to the first loudspeaker L1 than to the second loudspeaker, which means that ultrasonic signals transmitted by the first loudspeaker L1 are received much more quickly than ultrasonic signals transmitted by the second loudspeaker L2. This results in relatively large propagation time differences.

When at least three loudspeakers are used to perform the method, an explicit position for the electronic device 60 is obtained. The exact position can be determined by means of suitable lateration and trilateration methods (when using three loudspeakers) or multilateration methods (when using more than three loudspeakers), for example.

When using three loudspeakers for position determination, it is fundamentally possible for a position in a plane to be determined. When using four or more loudspeakers, it is additionally also possible for the relative height of the electronic device 60 in or outside the vehicle 10 to be determined. For this, the loudspeakers may also be arranged at different heights in the vehicle 10, for example.

Such methods can have certain inaccuracies, however, and are susceptible to attacks from third parties. Thus, according to one example of an aspect of the invention, there is provision for the ascertained position of the electronic device 60 to be subsequently checked and verified. For this, subsequent to the method for position determination described above, further ultrasonic signals are transmitted via the loudspeakers L1, L2. In a first step described above, the system determined the first distance of the electronic device 60 from the first loudspeaker L1 and the second distance of the electronic device 60 from the second loudspeaker L2 and possibly also the distances from further loudspeakers. The system thus knows the propagation time of the signals between the applicable loudspeakers L1, L2 and the electronic device 60. The various loudspeakers L1, L2 transmit further ultrasonic signals in a subsequent step such that said signals cancel one another out at the previously determined positions P1, P2 of the electronic device 60. That is to say that the signals have the same amplitude, but an opposite phase. The further ultrasonic signal generated by the second loudspeaker L2 is thus consistent with the further ultrasonic signal transmitted by the first loudspeaker L1, but is opposite in its phase (antisound). This principle is also known as active noise cancellation (ANC). So that the signals can cancel one another out, the ultrasonic signals are transmitted with staggered timing in relation to one another if need be, so that they arrive at the determined position P1, P2 of the electronic device 60 at the same time. That is to say that the time at which a signal is transmitted is dependent on the distance of the ascertained position of the electronic device 60 from the applicable loudspeaker L1, L2. Only if the signals arrive at the desired position at the same time can they also cancel one another out at said position.

The electronic device 60 is at a first distance r1 from the first loudspeaker L1 and a second distance r2 from the second loudspeaker L2, for example. If the first distance r1 and the second distance r2 are identical, the further ultrasonic signals are each transmitted by the first and the second loudspeaker L1, L2 at the same time so that they arrive at the determined position P1, P2 at the same time. If the first distance r1 is shorter than the second distance r2 (see FIG. 5), for example, the first loudspeaker L1 transmits the further signal at a correspondingly later time than the second loudspeaker L2. The time delay when transmitting the ultrasonic signal is in this case consistent with the propagation time difference between the signals from the respective loudspeakers L1, L2 at the determined position P1, P2.

By way of example, the electronic device 60 knows that the previously determined position P1, P2 is checked once again in a further step. It, thus knows that it should not receive further ultrasonic signals, since these cancel one another out as described if the electronic device 60 is actually at the previously determined position P1, P2. If the electronic device 60 still receives further ultrasonic signals, it knows that the previously performed position determination was not correct. The electronic device 60 can communicate this to the control and transmission unit 20 in the vehicle, for example, if further ultrasonic signals were received. If the position determination was erroneous, it can subsequently be repeated once again, for example. A communication from the electronic device 60 to the control and transmission unit 20 can again be effected via a Bluetooth link, for example.

In this case, it may be that tolerances in the system mean that the phases of the additional ultrasonic signals are not precisely opposite, or the signals do not arrive at the determined position P1, P2 at exactly the same time. It is thus a possibility that the two signals will admittedly cancel one another out for the most part, but not entirely. A possibly remaining ultrasonic signal that still arrives at the determined position P1, P2 is barely or not at all perceptible to the electronic device 60, however. Thus, the electronic device 60 can compare the volume of a received further ultrasonic signal with a prescribed limit value, for example. If the volume of the received ultrasonic signal is below the limit value, it is assumed that the signals do not cancel one another out entirely merely on account of tolerances and the electronic device 60 is at the determined position P1, P2. Only after a determined prescribed volume of the signal above the limit value can it be assumed that the electronic device 60 is not at the determined position P1, P2.

If ultrasonic signals from unauthorized persons are extended over long distances as described above in relation to relay attacks, the position is normally determined incorrectly by the system. The method described above can therefore normally prevent or at least significantly hamper such attacks.

A further exemplary way of protecting entry and starting systems more effectively against such attacks is, by way of example, to perform a communication by means of ultrasound subsequent to the setup of a radio link between the control and transmission unit 20 in the vehicle 10 and the electronic device 60. By way of example, the control and transmission unit 20 can initially use the radio link to communicate to the electronic device 60 relevant parameters for the subsequent ultrasonic link that need to be observed by both parties. During the subsequent ultrasonic link, at least one ultrasonic signal is sent between the control and transmission unit 20 and the electronic device 60. The control and transmission unit 20 can previously stipulate how many signals are to be sent. Moreover, the control and transmission unit 20 can stipulate the direction in which the signals are each to be sent, that is to say whether the control and transmission unit 20 transmits the signals itself or whether the electronic device 60 transmits the signals. Additionally, the control and transmission unit 20 can also prescribe the times at which the signals are each to be sent. It is also possible for a frequency and a volume of the signals to be stipulated, for example.

By way of example, the control and transmission unit 20 can stipulate that a total of ten signals are to be sent. In this case, the signals are meant to be alternately sent by the control and transmission unit 20 and the electronic device 60. As a result, the direction of the signals is repeatedly changed very quickly during the ultrasonic link. This allows the security of the system to be increased. An attacker does not know when and in which direction the signals are each sent. That is to say that an attacker must always be able to send and receive in both directions at any time. This normally results in feedback in applicable devices. To avoid feedback, very complex and consequently expensive and large devices are normally required. The required volume at which the signals are to be sent is also not known to an attacker. Therefore, the volume cannot normally be simulated with sufficient accuracy by an attacker. The same applies to the frequency of the signals.

Both the direction of the ultrasonic signals and the volume and frequency can be altered repeatedly during an ultrasonic link in order to increase security. In this case, one or more signals can be sent in succession in one direction and subsequently one or more signals can be sent in the other direction. Since the parameters were previously stipulated by the control and transmission unit 20 and are known to the electronic device 60, the control and transmission unit 20 and the electronic device 60 can subsequently communicate with one another in accordance with the stipulated parameters. The parameters can be checked both by the control and transmission unit 20 and by the electronic device 60 as appropriate during the ultrasonic link.

The parameters are re-stipulated before every new ultrasonic link. The parameters are stipulated randomly in this case. It is therefore not possible for an attacker to infer the parameters of a subsequent conversation by observing the parameters of a conversation. The parameters are stipulated in this case, as described above, by means of a radio link. By way of example, the control and transmission unit 20 communicates the parameters to the electronic device 60 before every new ultrasonic link. However, it is also possible for the electronic device 60 to stipulate the parameters and to communicate them to the control and transmission unit 20. A further option is for both the control and transmission unit 20 and the electronic device 60 to be involved in stipulating the parameters. The applicable communication for stipulating the parameters can take place in encrypted fashion in this case, so that the applicable communication cannot be monitored by attackers. Suitable encryption methods are sufficiently well known and are not described in more detail at this juncture.

Alternatively or additionally, it is also possible to use pseudorandom noise (PRN) for sending the ultrasonic signals between control and transmission unit 20 and electronic device 60. Pseudorandom noise is fundamentally the name for digital signals that have the statistical properties of random noise. The signal to be sent is generated by the transmitter by means of an applicable generation specification. An attacker normally receives only noise and cannot filter out the desired signal from the noise. The desired signal can be filtered out from the background noise only if the generation specification for the signals is known. The receiver knows the generation specifications, so that it can filter out the signal from the noise by means of suitable filter algorithms and can subsequently process said signal.

One way of generating the ultrasonic signals in the vehicle is to use the loudspeakers that are present in the vehicle 10. Every vehicle normally has loudspeakers that are used for an audio system, an installed navigation appliance and/or a hands-free device, for example.

Instead of using additional loudspeakers installed in the vehicle, however, it is alternatively or additionally also possible to generate ultrasonic signals by virtue of particular surfaces in the vehicle being set oscillating. For this, the vehicle 10, or the entry and starting system, can have a sound generating unit having at least one actuator, for example, that, in order to generate (ultra)sound, sets applicable surfaces of the vehicle oscillating. Known audio systems in vehicles normally have treble, midrange and bass loudspeakers. The diaphragms of the loudspeakers are then excited in order to generate sound, or ultrasound, as appropriate. Instead of the diaphragms of loudspeakers, however, it is also possible to excite elements in the vehicle, for example, such as the A pillar (e.g. for high frequencies), door linings (e.g. for midrange frequencies), the roof lining or the rear parcel shelf (e.g. for low frequencies), for example. Further elements and surfaces in the vehicle for generating sonic waves, in particular ultrasonic waves, are likewise conceivable, such as windowpanes, for example.

The ultrasonic waves are generated by compact actuators, for example, that resemble the core of a conventional loudspeaker. These actuators have a magnet and a coil, for example, that generate micro-oscillations. Instead of the oscillating diaphragm, as is known from conventional loudspeakers, the actuators excite one or more elements and/or surfaces of the vehicle in order to radiate sound, however. Sound is radiated in this case not only into the interior of the vehicle but also into the exterior of the vehicle. The entry and starting system can have its own actuators in this case. Such actuators may also already be present in the vehicle 10 and replace conventional audio systems, however. The elements already present can then in turn be used for the entry and starting system, so that no or only few additional components are required on the part of the vehicle in order to implement the entry and starting system.

Figure 6:
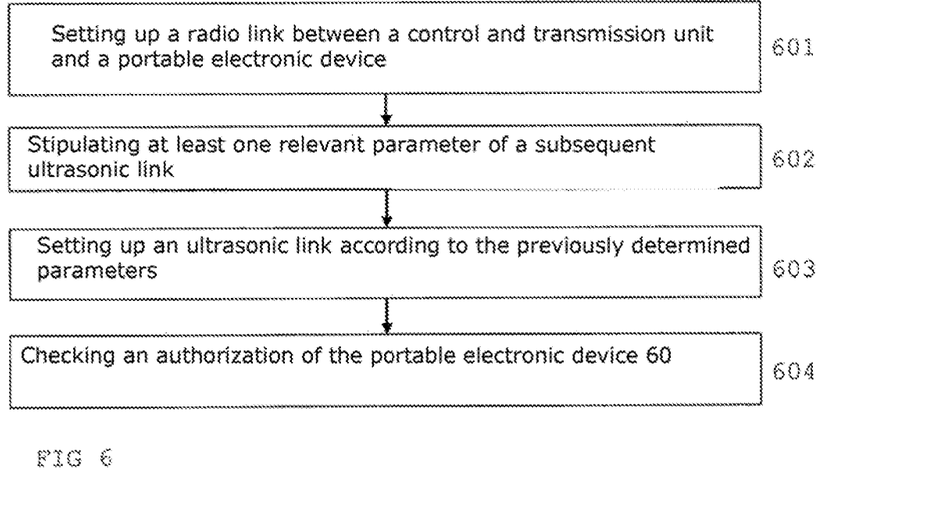
FIG. 6 shows a flowchart of a method for entry and starting verification according to an embodiment of the invention.

FIG. 6 uses a flowchart to schematically depict a method for entry and starting verification. The method involves setting up a radio link between a control and transmission unit 20 and a portable electronic device 60 (step 601). The radio link is used to stipulate at least one relevant parameter of a subsequent ultrasonic link (step 602). Subsequently, an ultrasonic link is set up according to the previously determined parameters (step 603) and an authorization of the portable electronic device 60 is checked (step 604), the portable electronic device 60 being detected as authorized if the at least one relevant parameter of a subsequent ultrasonic link is concordant with the at least one stipulated parameter.

Figure 7:
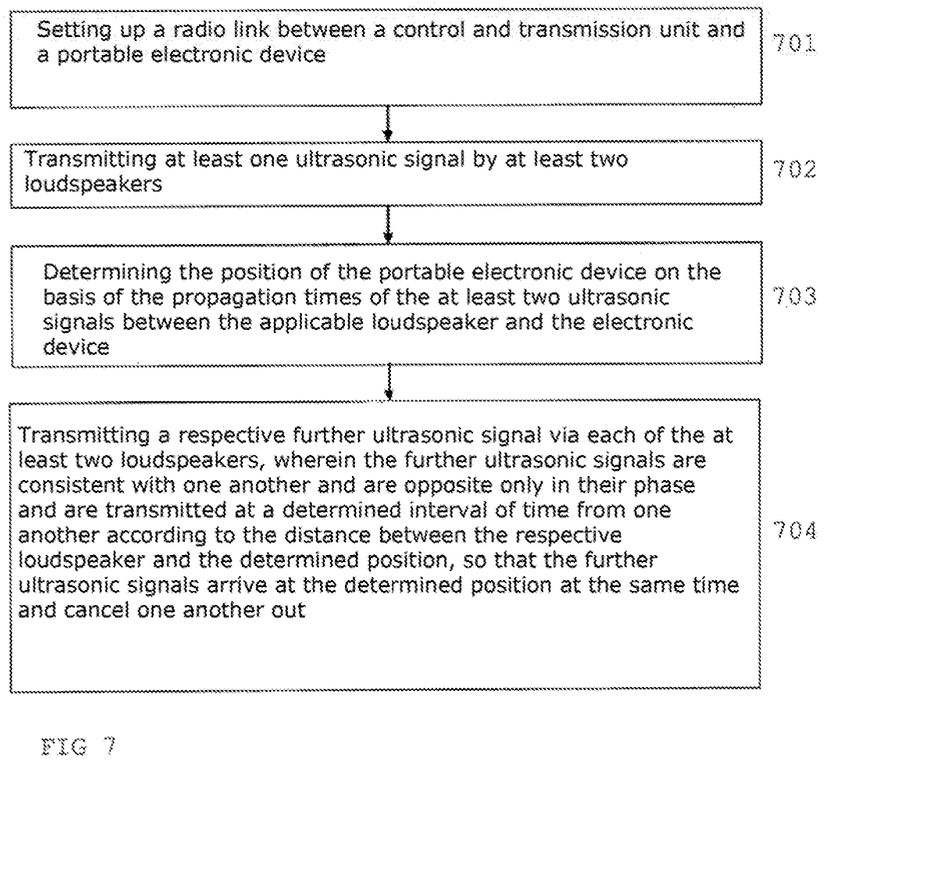
FIG. 7 shows a flowchart of a method for position determination for an electronic device according to an embodiment of the invention.

FIG. 7 uses a flowchart to schematically depict a method for entry and starting verification. The method involves setting up a radio link between a control and transmission unit 20 and a portable electronic device 60 (step 701). At least two loudspeakers L1, L2 in the object are then each used to transmit at least one ultrasonic signal (step 702). The position of the portable electronic device 60 is determined on the basis of the propagation times of the at least two ultrasonic signals between the applicable loudspeaker L1, L2 and the electronic device 60 (step 703), wherein the determined position is at a respective determined distance r1, r2 from each of the at least two loudspeakers L1, L2. Subsequently, a respective further ultrasonic signal is transmitted via each of the at least two loudspeakers L1, L2 (step 704), wherein the further ultrasonic signals are consistent with one another and are opposite only in their phase and are transmitted at a determined interval of time from one another according to the distance between the respective loudspeaker L1, L2 and the determined position, so that the further ultrasonic signals arrive at the determined position at the same time and cancel one another out.

An aspect of the invention has been described using the example of a vehicle 10, in particular using the example of a passenger vehicle. The entry and starting system described can be used for any desired type of vehicle, however, such as trucks, buses, tractors, motorcycles, boats, aircraft, etc., for example. However, aspects of the invention can be used not only for vehicles 10 but also for any type of objects that can be locked or unlocked by means of an electronic device 60, such as residential buildings, apartments, offices, warehouses, garage doors, etc., for example. A vehicle 10 may be a passenger vehicle, for example.

LIST OF REFERENCE SIGNS

10 Vehicle
20 Control and transmission unit
30 Transponder unit
40 First device
50 Second device
60 Electronic device
L1, L2 Loudspeaker
P1, P2 Determined position

The invention claimed is:

1. An entry and starting system in an object, the entry and starting system comprising:
   a control and transmission unit configured to use a radio link to interchange at least one radio signal in at least one direction and to use an ultrasonic link to interchange at least one ultrasonic signal in at least one direction with a portable electronic device, wherein
   the control and transmission unit is configured to set up a radio link to the portable electronic device and to use the electronic device via the radio link to stipulate at least one relevant parameter for a subsequent ultrasonic link,
   the control and transmission unit is additionally configured so as, following the stipulation of the parameters, to set up an ultrasonic link according to the previously determined parameters, and
   the entry and starting system is configured to check an authorization of the portable electronic device, the portable electronic device being detected as authorized if the at least one relevant parameter of the subsequent ultrasonic link is concordant with the at least one stipulated parameter,
   wherein the at least one relevant parameter is stipulated randomly before every ultrasonic link.

2. The entry and starting system as claimed in claim 1, wherein the at least one parameter to be stipulated has at least one from:
   a number of ultrasonic signals sent during the subsequent ultrasonic link;
   a direction in which at least one ultrasonic signal is sent during the subsequent ultrasonic link;
   at least one time at which at least one ultrasonic signal is sent during the subsequent ultrasonic link;
   a volume of the at least one ultrasonic signal sent during the subsequent ultrasonic link;
   a frequency of the at least one ultrasonic signal sent during the subsequent ultrasonic link.

3. The entry and starting system as claimed in claim 1, wherein the radio link is an encrypted radio link.

4. The entry and starting system as claimed in claim 1, wherein the control and transmission unit and/or the electronic device are moreover configured to generate pseudorandom noise for sending the ultrasonic signals and to filter out ultrasonic signals from received pseudorandom noise.

5. The entry and starting system as claimed in claim 2, wherein during the subsequent ultrasonic link at least one from the direction of the signals, the volume of the signals and the frequency of the signals changes at least once.

6. The entry and starting system as claimed in claim 1, wherein the electronic device is a cellphone, a smartphone, a tablet or a laptop.

7. The entry and starting system as claimed in claim 1, wherein the object is a vehicle.

8. The entry and starting system as claimed in claim 1, further comprising a sound generation unit, wherein the sound generation unit has at least one actuator configured to generate ultrasound by setting at least one surface of the object oscillating.

9. A method for entry and starting verification, the method comprising:
   setting up a radio link between a control and transmission unit and a portable electronic device,
   stipulating at least one relevant parameter for a subsequent ultrasonic link,
   setting up an ultrasonic link according to the previously determined parameters, and
   checking an authorization of the portable electronic device, the portable electronic device being detected as authorized if the at least one relevant parameter of a subsequent ultrasonic link is concordant with the at least one stipulated parameter,
   wherein the at least one relevant parameter is stipulated randomly before every ultrasonic link.

* * * * *